United States Patent [19]

Cain

[11] Patent Number: 5,129,051
[45] Date of Patent: Jul. 7, 1992

[54] DECOMPOSITION OF ARBITRARY POLYGONS INTO TRAPEZOIDS

[75] Inventor: Bradley W. Cain, Ft. Collins, Colo.

[73] Assignee: Hewlett-Packard Company, Palo Alto, Calif.

[21] Appl. No.: 494,292

[22] Filed: Mar. 16, 1990

[51] Int. Cl.$^5$ ............................................. G06F 15/62
[52] U.S. Cl. ..................................... 395/133; 395/134; 395/141
[58] Field of Search ........................ 364/518, 521, 522; 340/723; 395/133, 134, 141

[56] References Cited

U.S. PATENT DOCUMENTS 4,725,831  2/1988  Coleman ........................ 340/723 X
4,791,582  12/1988  Ueda et al. ...................... 364/521 X
5,020,002  5/1991  Malachowsky .................... 364/518

OTHER PUBLICATIONS

Fuchs et al., "Pixel-Planes 5: A Heterogeneous Multiprocessor Graphics System Using Processor-Enhanced Memories," Computer Graphics, vol. 23, No. 3, Jul. 1989, pp. 79-88.

D. T. Lee, "Shading of Regions on Vector Display Devises," Computer Graphics, vol. 15, No. 3, Aug. 1981, pp. 37-44.

Rhoden et al., "Hardware Acceleration for Window Systems," Computer Graphics, vol. 23, No. 3, Jul. 1989, pp. 61-67.

Primary Examiner—Gary V. Harkcom
Assistant Examiner—Mark K. Zimmerman
Attorney, Agent, or Firm—Guy J. Kelley

[57] ABSTRACT

A technique for decomposing any simple or complex arbitrary polygon into a trapezoid having at least one edge parallel to the scan direction for more efficient scan conversion by rasterization circuitry. An input polygon is split into "slabs", which are adjacent regions bounded by lines parallel to the scan direction. Initially the polygon is split at the y coordinate of every vertex to define the slabs. Then, for each slab, it is determined which edges are present in the slab and whether there are any unacceptable edge intersections. If an unacceptable edge intersection is found in a slab, that slab is broken into two or more slabs at the y coordinates of the intersection points of the edges. Each of the slabs is then processed independently. Once no unacceptable intersections are found in any slab, trapezoids are rendered from adjacent pairs of edges and sent to the rasterization circuitry. Since edge intersections may be accounted for in accordance with the invention, any input polygon, no matter how complex, may be correctly rendered in an efficient manner.

12 Claims, 3 Drawing Sheets

DECOMPOSITION OF ARBITRARY POLYGONS INTO TRAPEZOIDS

CROSS-REFERENCE TO RELATED APPLICATIONS

The present application is related to U.S. patent application Ser. No. 07/493,185, filed Mar. 14, 1990, assigned to the same assignee as this application and hereby incorporated by reference in its entirety as if fully set forth herein.

BACKGROUND OF THE INVENTION

1. Field of the Invention

The present invention relates to a graphics transformation engine, and more particularly, to a process and apparatus for decomposing any arbitrary input polygons representing an image into trapezoids which can be rendered more efficiently by a raster scan conversion system.

2. Description of the Prior Art

Prior art raster graphics systems generally contain two distinct parts: a graphics transformation engine that transforms and lights the geometric description of a scene in accordance with the user's viewpoint and a renderer that paints the transformed scene onto a display screen. As is well known, the geometric description of the scene may comprise a combination of a plurality of polygons having an arbitrary number of sides. In other words, the 3-dimensional image to be displayed has been described as a surface composed of polygons of differing shadings. As used herein such a "polygon" refers to an ordered set of vertices $V[1]...V[N]$ where N is the vertex count for the polygon. These vertices specify the N edges of the polygon, which are line segments $E[1]...E[N]$ with end points made up of respective vertices $V[1]...V[N]$. For example, line segment $E[1]$ may have end points $V[1]$ and $V[2]$, while line segment $E[2]$ has end points $V[2]$ and $V[3]$. Such polygons may be identified by the graphics transformation engine as a sequence of graphics primitives including information such as the coordinates (X,Y,Z) of the vertices of each polygon as well as the shading information for each of the vertices and instructions which are processed in the graphics transformation engine for all pixel-level rendering computations.

Such geometric representations of a scene greatly facilitate the processing by a graphics transformation engine which is necessary for rendering the pixel image data to the display screen. The graphics transformation engines typically perform many tasks on such data including graphics context management, matrix transformation calculations, spline tessellation and lighting model computations. The transformation engines may also control vector and polygon rendering hardware. However, such computations are generally quite complex and timeconsuming and require much processing power, and the resulting processing difficulties have often been the primary limitation upon the speed by which images may be rendered in conventional raster graphics systems.

The most common proposal for solving the above-mentioned problem has been to increase the processing power of the graphics transformation engines. For example, a plurality of transformation engines have been provided in parallel so that the processing of each of the respective polygons may be performed in parallel. However, such systems are quite complicated and expensive and still do not process the polygons efficiently. As a result, the processing efficiency for graphics primitives information has bee heretofore severely limited. Thus, it is desirable that means be provided for improving the processing efficiency of graphics transformation engines so that even complex 3-dimensional images containing numerous simple polygons may be rendered at interactive rates.

It has been previously proposed to render polygons representing an image onto a display screen in a vector display system by breaking the input polygons into trapezoids. For example, Lee proposes in "Shading of Regions on Vector Display Devices," Computer Graphics, Vol. 15, No. 3, August 1981, a technique for breaking an arbitrary simple polygon of a graphics vector display system into a plurality of trapezoids for rendering on the display screen. In particular, Lee proposes an algorithm for shading the interior of an arbitrary simple polygon having N vertices with a set of parallel lines where the slope and the distance between the lines are pre-specified. The algorithm of Lee for rendering an arbitrary simple polygon P represents the polygon as an ordered list of vertices forming respective straight-line segments, or edges, between vertices where no two non-consecutive edges intersect (i.e., crossing edges cannot be rendered). Lee breaks the input polygons into a plurality of trapezoids for shading since in a vector scanning system of the type proposed by Lee, all the shading lines are typically horizontal (i.e., the shading is accomplished by rendering a plurality of horizontal vectors between the polygon's edges).

In Lee's rendering system, the vertices of the polygon are described in accordance with their relationship with the y-axis. In particular, the vertices are defined as to whether they are a local minimum (stalactitic) in the y-direction, a local maximum (stalagmitic) in the y-direction, or are regular vertices. Le sorts the vertices of the polygon according to their y-coordinates and then examines each of the vertices to determine whether they are local minima, local maxima, or regular vertices. The vertices are then linearly scanned from bottom to top, and a list of segments of critical lines (horizontal lines passing through a vertex) that are interior to the polygon and a linked list of edges is also maintained. The edges in the linked list are ordered from left to right according to the intersection points of these edges with the critical lines. Then, when each vertex is scanned, different operations are performed depending upon the type of vertex encountered. The algorithm terminates when the topmost vertex is scanned or the linked list is empty.

As previously noted, the system of Lee is described only with respect to a vector display system and operates only for simple polygons having no two non-consecutive edges which intersect (i.e., edges may cross only at the vertices). Moreover, the algorithm of Lee relies upon the classification of each of the vertices of the input polygon and thus requires substantial setup before the algorithm can be performed. As a result, a complex polygon with intersecting edges cannot be rendered by Lee's system. Moreover, there is no indication in the prior art as to how the technique taught by Lee could be used to render points in a pixel display system. Since it is desirable for a rendering system to be able to render any input polygon, no matter how complicated, at a sufficient execution speed so that even complex three-dimensional images containing numerous complex polygons may be rendered at interactive rates, substantial improvement upon the rendering system of Lee remains necessary.

Accordingly, there is a long-felt need in the art for a polygon rendering system in which complex polygons, even those having crossing edges, can be processed and rendered at truly interactive rates. The present invention has been designed to meet these needs.

SUMMARY OF THE INVENTION

The above-mentioned long-felt needs in the art have been met in accordance with the present invention by providing a technique for decomposing arbitrary polygon into trapezoids so that the graphics raster display system can more readily scan convert input arbitrary polygons. In particular, in accordance with the invention polygons are divided into "slabs", which are defined as adjacent regions bounded by lines parallel to the scanning direction. Initially the polygon is split at the y values of every vertex of the polygon. Then, for each slab, the edges present in the slab are determined, and it is determined whether an unacceptable edge intersection is present. If so, that slab is broken into two slabs, each of which is processed independently, where the new division point for the two slabs occurs at the y value of the intersection point. If no further unacceptable intersections are found, trapezoids are formed from adjacent pairs of edges and sent to the rasterization subsystem. Since this technique requires little set-up, execution time is minimized. Moreover, since the invention accounts for polygons with crossing edges, any input polygon may be rendered, no matter how complicated.

In accordance with a preferred embodiment of the invention, a device is provided for rendering a plurality of polygons representing an image to a display device, where each polygon has an arbitrary number of vertices and a corresponding number of edges having edge data associated therewith. Such a device in accordance with the invention preferably comprises means for providing data including coordinate values of the arbitrary number of vertices and the edge data for the corresponding number of edges for each input polygon of the image as well as means for sorting the vertices by increasing coordinate values in a direction perpendicular to the scan direction. A polygon processor is also provided in accordance with the invention for breaking each input polygon into scanning regions parallel to the scan direction of the display device, where the scanning regions are bounded in a direction perpendicular to the scan direction by scan lines through respective sorted vertices. The polygon processor then determines whether any edges in each scanning region intersect and subdivides the scanning region having intersecting edges into subregions bounded on opposite ends in the direction perpendicular to the scan direction by the scan lines through the respective sorted vertices and on common ends in the direction perpendicular to the scan direction by a scan line through an intersection point of the intersecting edges. The edge data for the resulting scanning regions and subregions of each input polygon are then rendered to the display.

In another preferred embodiment of the invention, the sorting means sorts the edges in each scanning region by increasing coordinate values in the scan direction at the points where each edge crosses the scan line through the sorted vertex having a lesser coordinate value in the direction perpendicular to the scan direction. In addition, when at least two edges in each scanning region cross the scan line through the vertex having a lesser coordinate value in the direction perpendicular to the scan direction at a common point, the sorting means further sorts edges by increasing slope value in the scan line direction. Pairs of the sorted edges are then stored as respective odd and even entries in an edge array. The polygon processor then forms the subregions for scanning regions containing crossing edges except when an edge of an edge pair stored as an odd entry in the edge array crosses a subsequent edge of the edge pair stored as an even entry in the edge array. This exception takes advantage of a raster subsystem's ability to directly render "hourglass" shaped trapezoids.

In accordance with another feature of the invention, the rendering means does not render scanning regions and subregions having less than a predetermined thickness in the direction perpendicular to the scan direction. In a preferred embodiment, this thickness is one scan line.

The invention also comprises a method of rendering a plurality of polygons representing an image to a display device, where each polygon has an arbitrary number of vertices and a corresponding number of edges having edge data associated therewith. Such a method in accordance with the invention preferably comprises the steps of:

providing data including coordinate values of the arbitrary number of vertices and the edge data for the corresponding number of edges for each input polygon of the image;

sorting the vertices by increasing coordinate values in a direction perpendicular to a scan direction;

breaking each input polygon into scanning regions parallel to the scan direction of the display device, where the scanning regions are bounded in a direction perpendicular to the scan direction by scan lines through respective sorted vertices, including the steps of determining whether any edges in each scanning region intersect and subdividing a scanning region having intersecting edges into subregions bounded on opposite ends in the direction perpendicular to the scan direction by the scan lines through the respective sorted vertices and on common ends in the direction perpendicular to the scan direction by a scan line through an intersection point of the intersecting edges; and rendering the edge data for each scanning region and subregion of each input polygon to the display device.

In accordance with a preferred embodiment, the sorting step includes the steps of sorting the edges in each scanning region by increasing coordinate values in the scan direction at the points where each edge crosses a scan line through a one of the respective sorted vertices having a lesser coordinate value in the direction perpendicular to the scan direction, and storing edge pairs of the sorted edges as respective odd and even entries in an edge array, and the polygon breaking step includes the step of forming the subregions for scanning regions containing intersecting edges except when an edge of an edge pair stored as an odd entry in the edge array crosses a subsequent edge of the edge pair stored as an even entry in the edge array. In addition, the sorting step may further include the step of sorting, by increasing slope in the scan line direction, those edges in each scanning region which cross each other and the scan line through the one of the respective sorted vertices having a lesser coordinate value in the direction perpendicular to the scan direction at a common point.

Another preferred embodiment of the method of the invention preferably includes the step of discarding those scanning regions and subregions having less than a predetermined thickness in the direction perpendicular to the scan direction before rendering in the rendering step so as to further increase processing efficiency. For example, in a preferred embodiment, the predetermined thickness is one scan line.

The process and apparatus in accordance with the invention thus arranged enables significant processing enhancements to be achieved since the trapezoids which pass through the scan conversion system may be rendered much more easily than the typical multi-sided arbitrary polygons often received by the raster scan conversion systems in prior art graphics display systems. Further benefits of the invention will be apparent from the following detailed description of the invention.

BRIEF DESCRIPTION OF THE DRAWINGS

The objects and advantages of the invention will become more apparent and more readily appreciated from the following detailed description of the presently preferred exemplary embodiment of the invention taken in conjunction with the accompanying drawings of which.

DETAILED DESCRIPTION OF THE PREFERRED EMBODIMENT

Figure 1:
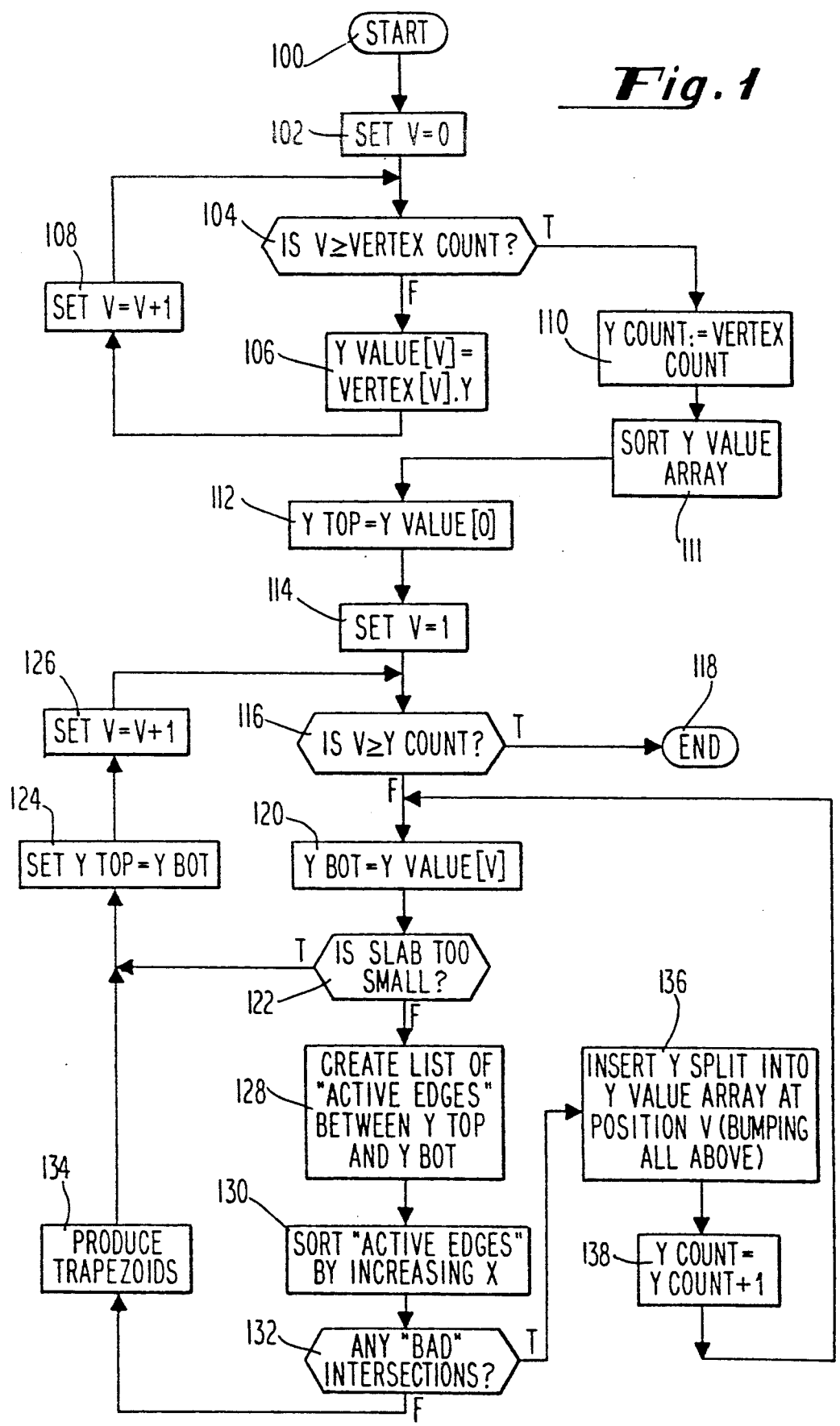
FIG. 1 illustrates an algorithm for producing trapezoids from arbitrary polygons in accordance with the invention.

The inventor of the subject matter disclosed and claimed herein has satisfied the above-mentioned long-felt needs in the art by developing a polygon processor which decomposes complex arbitrary input polygons into trapezoids which can then be easily rendered by a scan conversion system. As will be clear from the following description, the polygon processor of the invention functions as a sub-system of a graphics transformation engine to process the input polygons in such a way as to increase overall system performance. As also will be clear from the following, the polygon processor of the invention allows correct rendering of any polygon in a relatively short execution time. Moreover, the execution time may be further minimized by a method of edge intersection detection that runs in linear time based on the number of edges present in a slab.

A process with these and other beneficial features in accordance with a presently preferred exemplary embodiment of the invention will now be described with reference to FIGS. 1-3. It will be appreciated by those of ordinary skill in the art that the description given herein is for exemplary purpose only and is not intended in any way to limit the scope of the invention. All questions regarding the scope of the invention may be resolved by referring to the appended claims.

As described in the aforementioned copending application Serial No. 07/493,185, a polygon processor as herein defined is typically responsible for edge slope calculations and sub-pixel adjustments and for providing instructions to downstream hardware. In accordance with the present invention, however, the polygon processor further functions to decompose input polygons into trapezoids with one or two edges parallel to a coordinate direction of the display screen. Generally, all input polygons may be divided into trapezoids by the polygon processor of the invention, although in a preferred embodiment those polygons having fewer than a predetermined number of edges may be more efficiently processed by a trapezoidilization circuit of the type described in the aforementioned related application.

The polygon processor of the invention produces trapezoids from edge data it receives through a process referred to herein as "trapezoidilization". As used herein, "trapezoidilization" means the process of subdividing an input polygon into one or more trapezoidal regions having one or two edges parallel to a coordinate axis of the display device, where only one edge is parallel to the coordinate axis when either the top or bottom edge of the trapezoid is degenerate, i.e., is a single point, as for a triangle. In accordance with the invention, trapezoidilization may be performed for any input polygon having any number of vertices even if the input polygon has numerous crossing edges. The only limitation on the technique of the invention is the capabilities of the rendering system. For example, the present invention is described below for use with a rendering system which accepts hourglass-shaped trapezoids. However, one skilled in the art will appreciate that the techniques of the invention may also be used for rendering systems which do not render trapezoids having any crossing edges.

Before describing an embodiment of the invention with respect to FIGS. 1-3, a brief explanation will now be given of the principle of operation as well as some definitions to be used herein.

It has been observed that for an input polygon to represent a closed area it must have an even winding number, where the winding number corresponds to the number of edges a projected ray crosses when the ray is projected in a given direction across the polygon. In other words, any ray through a closed polygon must cross an even number of edges, and thus have an even winding number. Hence, if an input complex polygon is divided into a plurality of regions bounded by parallel rays, an even number of edges of the polygon will be present in each region. For purposes of the present application, each of these regions will be referred to as "slabs", where the projected rays are parallel to the scan direction and separate the input polygon into the respective slabs. Each slab of a input polygon may thus be defined by the coordinate values of points of the ray bounding the slab in the direction perpendicular to the scan line direction (hereinafter referred to as the "y-direction"). Herein, these values will be referred to as ytop, which is the y value of a point on the ray defining the top of the slab, and ybot, which is the y value of a point on the ray defining the bottom of the slab.

Thus, each slab includes an even number of edges (hereinafter referred to as "active edges") which may or may not cross depending upon the complexity of the input polygon. As noted above, the consecutive active edges within a slab may cross each other within a slab. This does not pose a problem if the edges are paired and hence define an hourglass-shaped trapezoidal region within the slab. Such regions may be rendered and shaded correctly by defining the vertex ordering and the side of an edge which constitutes the "inside" of the polygon. However, slabs having non-consecutive edges which intersect pose problems for the rendering circuitry since it is difficult to determine the proper rendering attributes for the edges (i.e., it is difficult to determine whether a given pixel is inside or outside of the polygon). For such slabs, the resulting trapezoid is not hourglass-shaped and may instead be concave in Y, where Y concavity is a property of a polygon where more than two edges are present in a scan line.

For example, if it is assumed that a complex polygon is concave in Y along a given ray and has a winding number of four for that ray, the edges crossed by the ray may be assigned, in order, the labels E=1, 2, 3 and 4. The first encountered edge along the ray, E=1, may cross the second encountered edge along the ray, E=2, for the resulting trapezoid would be hourglass-shaped. However, if edge E=1 crosses edge E=3, the resulting region could not be rendered as a single trapezoid. For the same reasons, edge E=2 may cross edge E=1 but may not cross edges E=3 or E=4 since edge E=2 is paired with edge E=1 to define a shaded region therebetween. Accordingly, if the first edge encountered by a ray is defined as E=1, odd numbered edges may cross the next even numbered edge since they form an edge pair, but other edge crossings are impermissible and are referred to herein as "bad" intersections. This distinction will be more clear from the discussion with respect to FIG. 3.

The polygon processor of the invention must receive all necessary data about a polygon before it can start to decompose it into trapezoids. This includes the vertex coordinates for each vertex as well as attributes about each edge. When this data is received, the polygon processor may proceed to make trapezoids. As will be described below, the polygon processor then sorts the vertices by their y values and compares the sorted vertices sequentially to determine the top and bottom y values for respective slabs. It is assumed that the polygon data is received as the respective vertices defining the polygon and an array of edges. Edges in this edge array will be active edges when they cross a slab being examined. Also, the variable xtop corresponds to the x coordinate of an edge at the point that it intersects the top of the current slab (ytop), while variable xbot corresponds to the x coordinate of an edge at the point that it intersects the bottom of the current slab (ybot). Finally, xslope corresponds to the slope of an edge and is defined by $\Delta x/\Delta y$. As will be described below, the active edges are sorted by increasing values of xtop, with ties being broken by increasing order of xslope.

The details of the algorithm implemented by the polygon processor to perform trapezoidilization in accordance with the invention will now be described with reference to FIGS. 1-3.

FIG. 1 illustrates a trapezoidilization algorithm in accordance with the invention. Processing starts at step 100 and an array of vertices of the input polygon is read into the polygon processor of the invention at steps 102-108. In particular, the input array of vertices is read in by setting an array variable V equal to 0 at step 102 and then comparing at step 104 the variable V with the vertex count corresponding to the number of vertices of the input polygon. If all vertices have not been read in, processing continues at step 106 where the y coordinate of the current vertex in the vertex array is read into the corresponding yvalue position in the yvalue array. The array variable V is then incremented in step 108 so that the loop may repeat to read in the next entry into the yvalue array. Once all vertex yvalues have been read in, control proceeds to step 110, where a variable ycount is assigned to the current vertex count. The values in the yvalue array are then sorted at step 111 using, for example, a fast sorting stack as described in copending application Ser. No. 07/478,126, filed Feb. 9, 1990 assigned to the same assignee as this application and hereby incorporated by reference in its entirety.

At step 112, the first value in the yvalue array is assigned as the value for ytop for the current slab and then a loop counter V is set to 1 at step 114. Steps 116 through 138 are then performed for each entry in the yvalue array. In particular, the loop counter V is compared with the value of ycount at step 116, and if the loop variable is greater than or equal to the value of ycount, all entries in the yvalue array have been read and processing ends at step 118. Otherwise, the value of ybot is assigned to the next value in the yvalue array at step 120. It is then checked at step 122 whether the respective ybot and ytop have approximately the same y coordinate, and if so, a new slab is not created. In other words, if the y coordinates of the respective vertices in the yvalue array are the same or, for example, within one scan line of each other, it is determined that the generation of such a small slab is too small to waste execution time to render. In such a case, control passes to step 124 where ytop is set equal to ybot and then the loop counter V is incremented at step 126. If the slab is not too small (i.e., ytop does not approximately equal ybot), control passes to step 128.

At step 128, a list of the active edges between ytop and ybot are determined. As noted above, the active edges are those edges which cross the slab defined by the rays through ytop and ybot parallel to the scan line. Then, at step 130, the active edges are sorted into an edge array by increasing values of xtop (i.e., in the order in which a ray traveling in the increasing x direction at the top of the slab crosses the active edges). In particular, the xtop values of the intersection of the active edges with the ray through ytop are determined, and the edges are sorted by increasing order of xtop. If respective edges have the same value for xtop, the ties are broken by considering the values for xslope. For example, if two edges have the same value for xtop, the edge with the more positive value for xslope will be chosen as the first-encountered edge when sorting in the direction of increasing xtop.

After the active edges are sorted by increasing values for xtop, it is then determined at step 132 whether any "bad" intersections are present in the current slab. As noted above, a "bad" intersection is an intersection in which non-paired active edges intersect each other within the slab. As will be described with respect to FIG. 2, if no such "bad" intersections are present in the current slab, trapezoids within the slab are rendered at step 134 and the loop is repeated. However, if a "bad" intersection is found in step 132, the current slab is split into two or more slabs. The y coordinate at the point of separation of the slab is then inserted into the current position in the yvalue array at step 136, ycount is incremented at step 138 to account for the additional value in the yvalue array, and the loop is repeated. An exemplary algorithm for determining whether an intersection is a "bad" intersection will no be described in more detail with respect to FIG. 2.

The "bad" intersection algorithm starts at step 200 and determines at step 202 whether the value of xbot for the first edge in the sorted active edge array is less than the value of xbot for the second edge in the sorted active edge array. A variable Fence is then defined at step 204 or 206 as the edge having the greater value for xbot. A loop counter "count" is then set equal to 2 at step 208 for comparing in steps 210 through 226 the remaining pairs of edges in the edge array with the edge "Fence" to determine whether they cross it.

At step 210 it is determined whether the value for count is greater than or equal to the number of active edges within the current slab, and if so, processing proceeds to step 134 of FIG. 1 so that trapezoids may be produced. Otherwise, processing proceeds to step 212, where it is determined whether the value for xbot for the current edge is less than the value of xbot for the edge Fence. In other words, it is determined whether the current edge crosses the right-most of the previous edge pair. If these edges do in fact cross, this is a "bad" intersection, and the y intersection (ysplit) of these edges is determined in step 214 by solving the equations of the crossing edges simultaneously, such as by dividing the difference between the values for xtop of the crossing edges by the difference between the values of xslope of the crossing edges and adding the intercept value (ytop). On the other hand, if the value of xbot for the current edge is not less than the value for xbot for the edge Fence at step 212, processing proceeds to step 216 where it is determined whether the next edge crosses the edge Fence, and if so, the y intersection (ysplit) of these edges is determined at step 218 in the same manner as at step 214. Then, if ysplit is calculated at steps 212 or 216, the value for ysplit is inserted into the yvalue array at the current array position at step 136 (FIG. 1) by inserting the value for ysplit in the current array position and bumping all subsequent array values as described above. Also, since an additional yvalue is thus inserted into the yvalue array, the value for ycount must be incremented at step 138 before processing repeats. In this manner, the current slab is divided into two slabs having a common edge ysplit.

If it is determined in steps 212 and 216 that respective edges do not intersect, it is then determined at step 220 which of the current edge pair has a right-most value for xbot. That edge is then defined as the edge Fence at step 222 or step 224 before count is incremented at step 226 and processing repeated for the next pair of edges and the new edge Fence. This processing repeats until all edge pairs in the current slab have been considered.

The algorithms of FIGS. 1 and 2 will now be described with respect to FIG. 3, which shows an example of a complex arbitrary polygon having crossing edges, some of which are acceptable to a rendering circuit which can handle hourglass shaped trapezoids and other edges which are not acceptable. As shown, the complex polygon is defined by an array of vertices A, B, C, D, E, F, G, H, I, J, and K, which are input in the sequence just mentioned as adjacent vertices so that adjacent vertices in the input array define endpoints of the same edge of the polygon. Pixels interior to the polygon are shaded, while those outside the polygon are not. For the polygon in FIG. 3, the input vertex array would appear as follows: p0 vertex

[0] = A($X_2$, $Y_1$)
[1] = B($X_0$, $Y_3$)
[2] = C($X_2$, $Y_4$)
[3] = D($X_{17}$, $Y_4$)
[4] = E($X_{12}$, $Y_1$)
[5] = F($X_{14}$, $Y_0$)
[6] = G($X_9$, $Y_3$)
[7] = H($X_{12}$, $Y_3$)
[8] = I($X_7$, $Y_1$)
[9] = J($X_{12}$, $Y_0$)
[10] = K($X_5$, $Y_4$)

The y coordinates from the vertex array are read into the yvalue array in steps 104, 106 and 108 so that the following yvalue array results:

yvalue
[0] = $Y_1$
[1] = $Y_3$
[2] = $Y_4$
[3] = $Y_4$
[4] = $Y_1$
[5] = $Y_0$
[6] = $Y_3$
[7] = $Y_3$
[8] = $Y_1$
[9] = $Y_0$
[10] = $Y_4$ Then at step 110 ycount is set equal to the vertex count (11) and at step 111 the yvalue array is sorted. The sorted yvalue array for the polygon of FIG. 3 would be:

yvalue
[0] = $Y_0$
[1] = $Y_0$
[2] = $Y_1$
[3] = $Y_1$
[4] = $Y_1$
[5] = $Y_3$
[6] = $Y_3$
[7] = $Y_3$
[8] = $Y_4$
[9] = $Y_4$
[10] = $Y_4$ At step 112 the value of ytop is set equal to the first entry in the yvalue array ($Y_0$) The loop is then entered, and the value for ybot is set as the next entry in the yvalue array ($Y_0$). However, since ytop equals ybot, it is determined at step 122 that the slab is too small, and the loop counter is incremented at step 126. Ytop remains equal to $Y_0$, but ybot is assigned to the next value in the yvalue array ($Y_1$) during the next loop iteration at step 120. $Y_0$ and $Y_1$ thus define a slab and processing proceeds to step 128 to create the list of active edges in slab 1.

Figure 2:
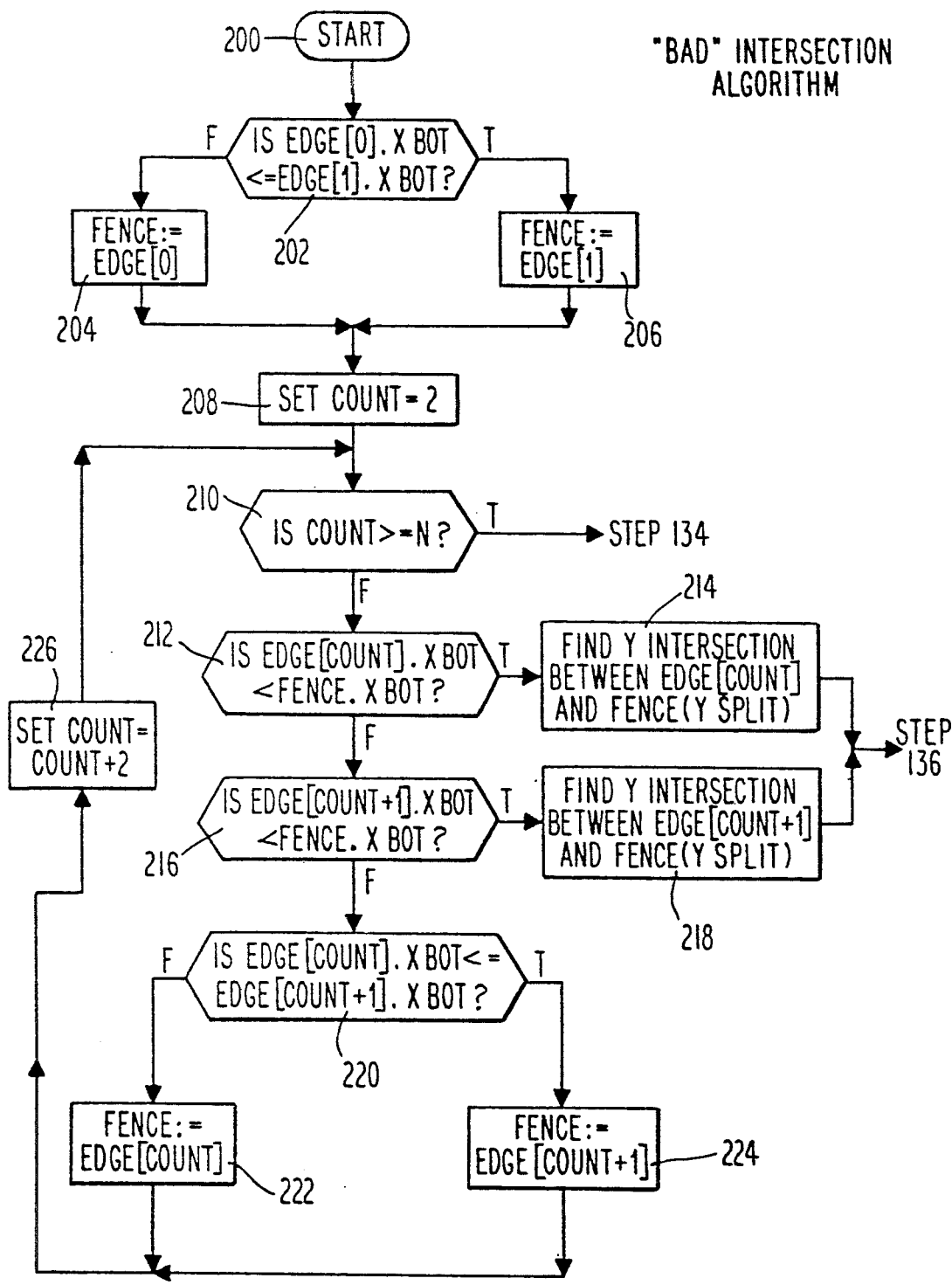
FIG. 2 illustrates an algorithm for determining whether edges within a slab intersect, and if so, breaking the current "slab" into two or more slabs.
Figure 3:
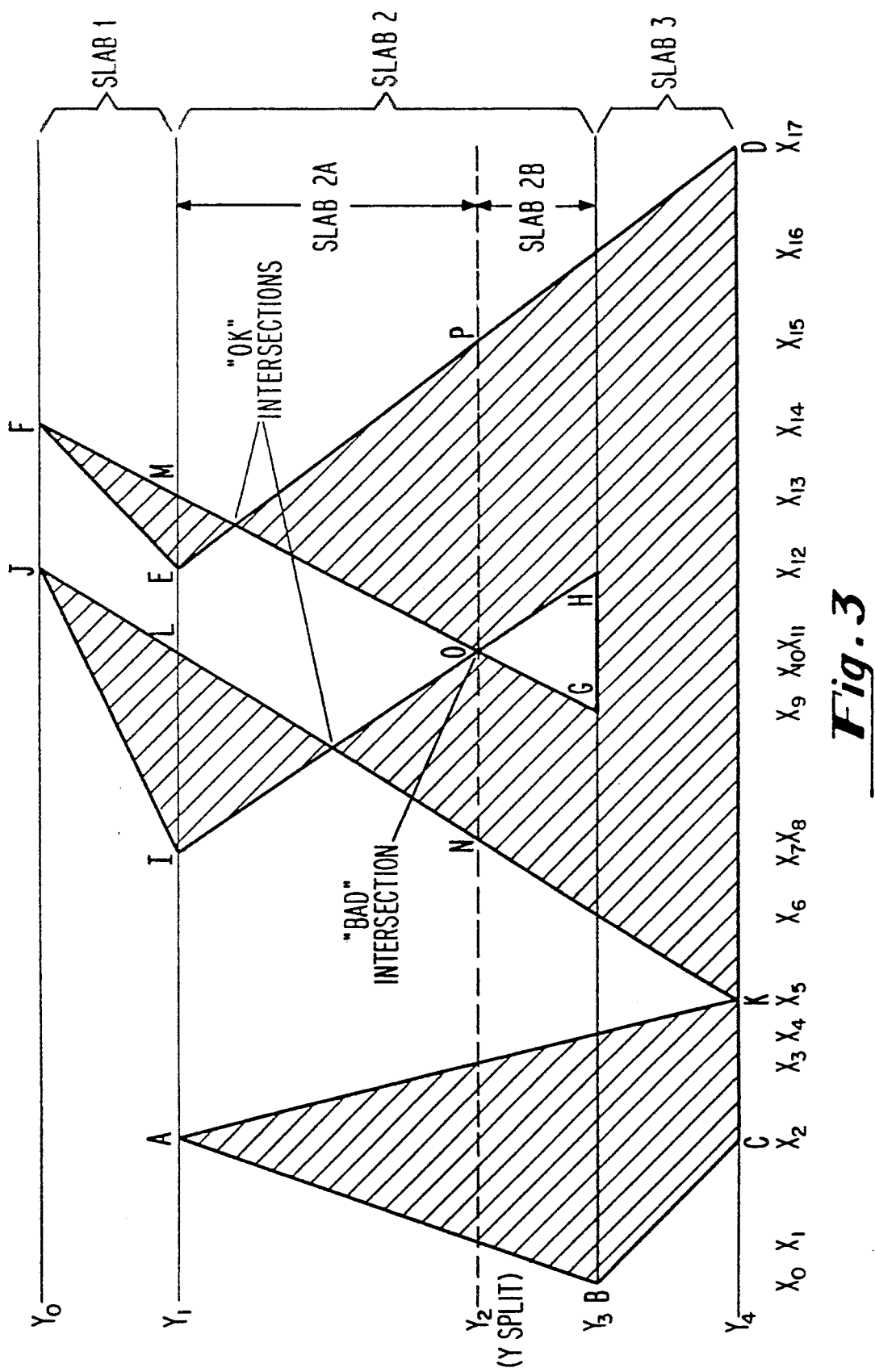
FIG. 3 illustrates a complex input polygon which is divided into trapezoids in accordance with the invention.

The active edges in slab 1 are edges IJ, JK, EF, and FG as shown in FIG. 3. These edges are sorted at step 130 into the order IJ, JK, EF, and FG, respectively, in accordance with the sorting principles noted above. It is then determined whether any of the edges intersect in accordance with the algorithm of FIG. 2. Since none of the edges intersect, processing then proceeds to step 134, where the trapezoids defined by triangles IJL and EFN are produced. The loop counter is then incremented and the next value from the yvalue array is assigned as ybot during the next loop iteration. Since yvalue [3] ($Y_1$) is the same as yvalue [2], it is determined that the slab is too small at step 122, and the loop counter is again incremented. Since yvalue [4] also equals yvalue [3], it is again determined that the slab is too small and the loop counter is again incremented so that the next yvalue may be read in. However, since yvalue [5] is equal to $Y_3$, processing proceeds to step 128 to create the list of the active edges in slab 2 (between $Y_1$ and $Y_3$). The active edges are then sorted by increasing xtop as described above, and the resulting array is as follows:

Edge
[0] = AB
[1] = KA
[2] = HI
[3] = JK
[4] = DE
[5] = FG

It is then determined at step 130 whether any of the edges of the above edge array intersect each other in accordance with the algorithm of FIG. 2. First, at step 202 it is determined whether xbot for edge AB is less than or equal to xbot for edge KA. Since xbot for edge AB ($X_0$) is less than xbot for edge KA ($X_4$) the edge Fence is assigned to be edge KA (the right-edge most edge) at step 206. The count is then set equal to 2 at step 208, and it is determined at step 212 that the next edge, edge[2] (HI), has a value for xbot ($X_{12}$) which is greater than the value for xbot for edge KA. It is similarly determined at step 216 that edge JK has a value for xbot ($X_6$) which is greater than the value of xbot for edge KA. Hence, edge HI and edge JK do not cross edge KA in slab 2. The edge Fence array is then reassigned as the right-most edge (HI) of the current edge pair, and the loop counter is incremented by 2 to read in the next pair of edges.

During the next iteration of the loop, it is determined at step 212 that edge[4] (DE) does not cross edge HI, but it is determined at step 216 that edge[5] (FG) crosses edge HI since edge FG has a value for xbot ($X_9$) which is less than the xbot value for edge HI ($X_{12}$). The intersection point between edges FG and HI is then determined in step 218 as ysplit ($X_{11}$, $Y_2$). Processing then proceeds to step 136 so that the new slab boundary ysplit can be inserted into the yvalue array for dividing the slab 2 into slab 2A and slab 2B as shown in FIG. 3. The yvalue array would then appears as follows:

yvalue
[0] = $Y_0$
[1] = $Y_0$
[2] = $Y_1$
[3] = $Y_1$
[4] = $Y_1$
[5] = $Y_2$ = Ysplit
[6] = $Y_3$
[7] = $Y_3$
[8] = $Y_3$
[9] = $Y_4$
[10] = $Y_4$
[11] = $Y_4$ Processing then repeats for the slab (slab 2A) defined by ytop = $Y_1$ and ybot = $Y_2$. Processing proceeds in this manner for the remaining values in the yvalue array until all slabs (and hence all polygons) have been rendered.

It will be appreciated by one of ordinary skill in the art that the algorithm described above splits slab 2 into slabs 2A and 2B because nonadjacent edges intersect. As noted above, since the rendering system in this example can handle hourglass trapezoids such as trapezoids OILN and OMEP, the intersections of edges HI and JK and of edges DE and FG are not treated as "bad" intersections. However, all such intersections may be treated as "bad" intersections if necessary to accommodate the rendering circuitry, and slab 2 may be divided into several slabs. It also will be appreciated by on of ordinary skill in the art that the above algorithm holds not just for the polygon shown but for any polygon having any number of input vertices and any number of crossing edges.

The polygon processor and trapezoidilization technique herein described provide significant performance enhancements in that for polygons with few edges little setup is required, while for more complicated polygons, execution time is minimized because the intersection detection process runs in linear time based on the number of edges present in a slab. Moreover, the invention is an improvement over any known technique in that it can render any polygon, no matter how complicated.

Although a single exemplary embodiment of the invention has been described in detail above, those skilled in the art will readily appreciate that many additional modifications are possible in the exemplary embodiment without materially departing from the novel teachings and advantages of the invention. For example, the order in which the vertices of an input polygon are read in may be varied and the software correspondingly changed. In addition, one skilled in the art will realize that rather than using Y coordinates in the algorithm of FIGS. 2 and 3 the trapezoids may be composed so as to be parallel with the Y axis instead of the X axis using the same algorithm. This would only require that all of the "x" values become "y" values and the "y" values become "x" values. In such a case, it would be necessary to find "xtop" and "xbot" rather than "ytop" and "tbot" to define a slab. In addition, for a rendering system which cannot render hourglass-shaped trapezoids, slabs may be divided for any crossing edges rather than just nonconsecutive crossing edges as herein defined. Moreover, it is possible to use just the x and y values for the vertices without calculating xbot and ybot by making minor modifications to the algorithm. Furthermore, the present invention ma be combined with the trapezoidilization circuit disclosed in the aforementioned copending application Ser. No. 07/493,185 into a single processing unit for more efficient polygon processing. Accordingly, all such modifications are intended to be included within the scope of this invention as defined in the following claims.

What I claim is:

1. A device for rendering a plurality of polygons representing an image to a display device, each polygon having an arbitrary number of vertices and a corresponding number of edges having edge data associated therewith, said device comprising:
    means for providing data including coordinate values of said arbitrary number of vertices and said edge data for said corresponding number of edges for each input polygon of said image;
    means for sorting said vertices by increasing coordinate values in a direction perpendicular to a scan direction;
    a polygon processor for breaking each input polygon into scanning regions parallel to said scan direction of said display device, said scanning regions being bounded in a direction perpendicular to said scan direction by scan lines through respective sorted vertices, said polygon processor further determining whether any edges in each scanning region intersect and then subdividing a scanning region having intersecting edges into subregions bounded on opposite ends in said direction perpendicular to said scan direction by said scan lines through said respective sorted vertices and on common ends in said direction perpendicular to said scan direction by a scan line through an intersection point of said intersecting edges; and means for sending the edge data for each scanning region and subregion of each input polygon to said display device for display.

2. A device as in claim 1, wherein said providing means provides each vertex of each input polygon to said polygon processor in a sequence of vertices such that adjacent vertices in the sequence of vertices define respective edges of each input polygon.

3. A device as in claim 1, wherein said sorting means sorts the edges in each scanning region by increasing coordinate values in the scan direction at points where each edge crosses a scan line through a one of said respective sorted vertices having a lesser coordinate value in said direction perpendicular to the scan direction and stores edge pairs of the sorted edges as respective odd and even entries in an edge array, and said polygon processor forms said subregions for scanning regions containing intersecting edges except when an edge of an edge pair stored as an odd entry in said edge array crosses a subsequent edge of said edge pair stored as an even entry in said edge array.

4. A device as in claim 3, wherein when at least two edges in each scanning region cross said scan line through the one of said respective sorted vertices having a lesser coordinate value in said direction perpendicular to the scan direction at a common point, said sorting means sorts said at least two edges by increasing slope in the scan lines direction.

5. A device as in claim 1, wherein said sending means does not send to said display device scanning regions and subregions having less than a predetermined thickness in said direction perpendicular to the scan direction.

6. A device as in claim 5, wherein said predetermined thickness is one scan line.

7. A method of rendering a plurality of polygons representing an image to a display device, each polygon having an arbitrary number of vertices and a corresponding number of edges having edge data associated therewith, comprising the steps of:

providing data including coordinate values of said arbitrary number of vertices and said edge data for said corresponding number of edges for each input polygon of said image;

sorting said vertices by increasing coordinate values in a direction perpendicular to a scan direction;

breaking each input polygon into scanning regions parallel to said scan direction of said display device, said scanning regions being bounded in a direction perpendicular to said scan direction by scan lines through respective sorted vertices, including the steps of determining whether any edges in each scanning region intersect and subdividing a scanning region having intersecting edges into subregions bounded on opposite ends in said direction perpendicular to said scan direction by said said lines through said respective sorted vertices and on common ends in said direction perpendicular to said scan direction by a scan line through an intersection point of said intersecting edges; and sending the edge data for each scanning region and subregion of each input polygon to said display device for display.

8. A method as in claim 7, wherein said providing step includes the step of providing each vertex of each input polygon in a sequence of vertices such that adjacent vertices in the sequence of vertices define respective edges of each input polygon.

9. A method as in claim 7, wherein said sorting step includes the steps of sorting the edges in each scanning region by increasing coordinate values in the scan direction at points where each edge crosses a scan line through a one of said respective sorted vertices having a lesser coordinate value in said direction perpendicular to the scan direction and storing edge pairs of the sorted edges as respective odd and even entries in an edge array, and said polygon breaking step includes the step of forming said subregions for scanning regions containing intersecting edges except when an edge of an edge pair stored as an odd entry in said edge array crosses a subsequent edge of said edge pair stored as an even entry in said edge array.

10. A method as in claim 9, wherein said sorting step includes the further step of sorting, by increasing slope in the scan line direction, those edges in each scanning region which cross each other and said scan line through the one of said respective sorted vertices having a lesser coordinate value in said direction perpendicular to the scan direction at a common point.

11. A method as in claim 7, including the step of discarding those scanning regions and subregions having less than a predetermined thickness in said direction perpendicular to the scan direction before sending in said sending step.

12. A method as in claim 11, wherein said predetermined thickness is one scan line.

* * * * *

UNITED STATES PATENT AND TRADEMARK OFFICE
CERTIFICATE OF CORRECTION

PATENT NO. : 5,129,051

DATED : July 7, 1992

INVENTOR(S) : Bradley W. Cain

It is certified that error appears in the above-identified patent and that said Letters Patent is hereby corrected as shown below:

Column 13, line 33, "lines" should read --line--;

Column 14, line 11, "said" should read --scan--.

Signed and Sealed this

Twenty-fourth Day of August, 1993

Attest:

BRUCE LEHMAN

*Attesting Officer*   *Commissioner of Patents and Trademarks*